United States Patent
Herchenroeder

[15] 3,639,116
[45] Feb. 1, 1972

[54] LANTHANUM-CONTAINING POWDERS FOR MAKING OXIDATION-RESISTANT METALLICS, METHOD OF MAKING SAME, AND METALLIC PRODUCTS MADE THEREFROM

[72] Inventor: Robert Blanchard Herman Herchenroeder, Kokomo, Ind.

[73] Assignee: Cabot Corporation, Boston, Mass.

[22] Filed: Jan. 6, 1970

[21] Appl. No.: 917

[52] U.S. Cl. ............................75/0.5 BB, 29/182.2, 75/214
[51] Int. Cl. ...........................................................B22f 1/00
[58] Field of Search ..............................75/0.5, 214; 29/182.2

[56] References Cited

UNITED STATES PATENTS

| | | | |
|---|---|---|---|
| 3,304,176 | 2/1967 | Wlodek | 75/171 |
| 3,356,542 | 12/1967 | Smith | 148/11.5 |
| 3,410,732 | 11/1968 | Smith | 148/32 |
| 3,524,744 | 8/1970 | Parikh | 75/0.5 BB |

Primary Examiner—Hyland Bizot
Assistant Examiner—W. W. Stallard
Attorney—Kenneth W. Brown, Arthur S. Collins, Barry R. Blaker and Lawrence A. Chaletsky

[57] ABSTRACT

A powder blend suitable for compaction and metallurgical bonding which contains at least 10 percent chromium and preferably at least 15 percent chromium, more than 30 percent and preferably more than 38 percent of either nickel, cobalt, or any combination thereof, and a lanthanum-silicon alloy containing at least 0.4 percent silicon, the lanthanum-silicon alloy being present in sufficient quantity such that the lanthanum content of the total powder mixture is about 0.2 to 0.2 percent and preferably 0.02 to 0.1 percent (by weight).

Products made from this blend as well as the method of making same are also disclosed.

5 Claims, 1 Drawing Figure

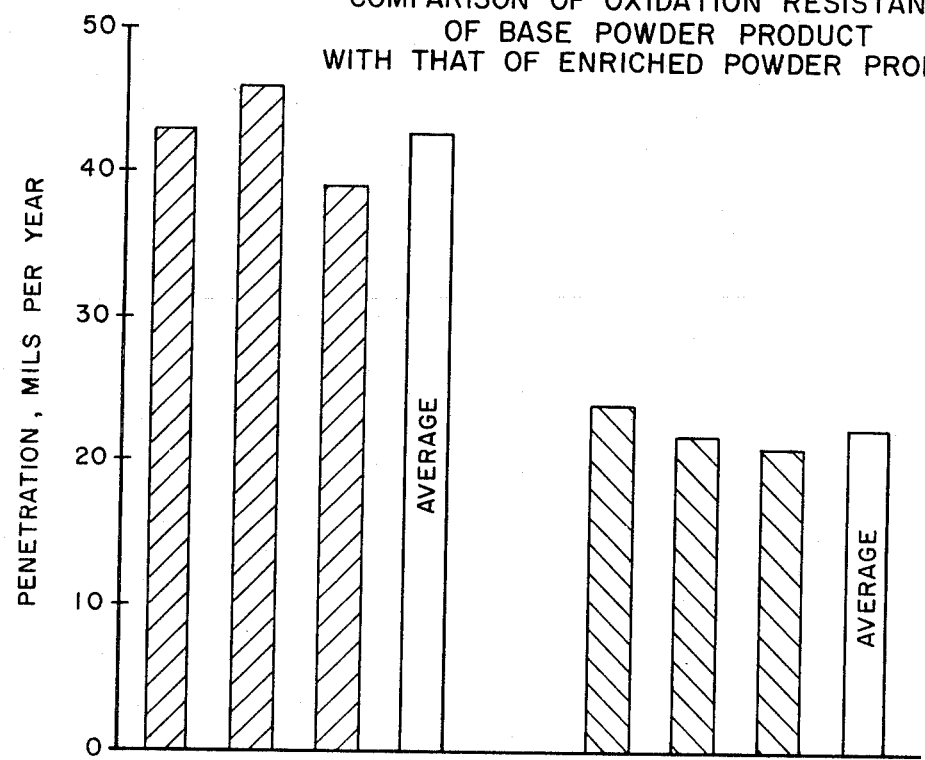
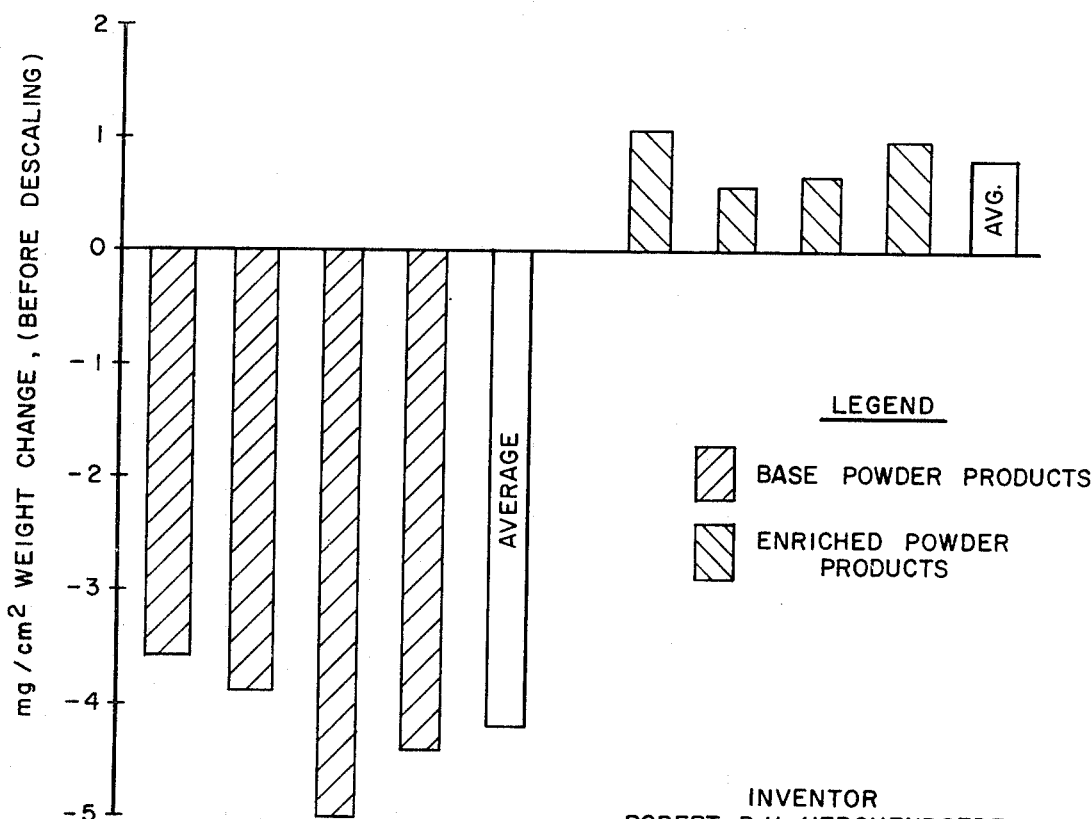
INVENTOR
ROBERT B.H. HERCHENROEDER

LANTHANUM-CONTAINING POWDERS FOR MAKING OXIDATION-RESISTANT METALLICS, METHOD OF MAKING SAME, AND METALLIC PRODUCTS MADE THEREFROM

This invention relates to oxidation-resistant metallics containing lanthanum and more specifically to certain powder mixtures which are suitable for compaction and metallurgical bonding to form oxidation-resistant metallic products therefrom. The invention also relates to compacted and metallurgically bonded metallic articles formed from the powders of the invention as well as the method of making such articles.

While it is known that superalloys having lanthanum additions offer significant oxidation resistance, it has heretofore been extremely difficult to form powders therefrom. The principle reason for this difficulty is that when one attempts to make powders by the known atomization processes a substantial loss of lanthanum results. This makes it very difficult to control the exact desired lanthanum content.

While many powder mixtures can be formed by merely mixing the powders, powder mixtures including lanthanum cannot be formed by such method. Lanthanum powder is difficult to use because of its pyrophoric characteristics and extremely chemical reactive nature, even at room temperature.

Because of the above-mentioned difficulties, the art has heretofore been unable to economically form powder mixtures suitable for being compacted into oxidation-resistant products, wherein the final mixture contains even nominal contents of lanthanum.

It is an object of the present invention to provide a powder mixture which is suitable for being compacted into a lanthanum-enriched oxidation-resistant metallic product.

Another object is to provide a method for forming a lanthanum-enriched oxidation-resistant metallic powdered metallurgy article.

Yet another object is to provide a method of forming a lanthanum-enriched oxidation-resistant metallic powdered metallurgy article without attendant losses due to lanthanum oxidation.

Still another object is to provide an oxidation-resistant compacted metallic article containing lanthanum.

According to one aspect of the present invention, a powdered mixture is provided which is well suited for being compacted into a lanthanum-enriched powdered metallurgy article. The powder mixture is comprised of (by weight) at least 10 percent chromium, more than 30 percent of nickel, cobalt, or a combination thereof, and a lanthanum-silicon alloy containing at least 0.4 percent silicon. The lanthanum-silicon alloy is present in the mixture in an amount sufficient to result in the total powder mixture containing 0.02 to 0.2 percent lanthanum.

Preferably, the chromium content of the powder mixture is between 15 percent and 35 percent, the lanthanum content is between 0.02 percent and 0.1 percent, and the aggregate content of nickel and/or cobalt is between 38 percent and the balance of the mixture.

While it is not mandatory that both nickel and cobalt be present together in the mixture, it is often convenient since most high temperature oxidation-resistant metallics include both elements. In many cases in which nickel and cobalt are to be used in forming the powder mixture of the invention, it is desirable and convenient to supply the same in prealloyed form. Such prealloyed material may also contain other elements usually found in heat-resistant metallics.

The size of the powder particles is generally not critical; however, the particles usually should be finer than 60 mesh Tyler Screen size in order for the mixture to be uniformly blended and efficiently compacted. If desired, suitable prior art binders may be employed with the powder mixtures of the invention in a known manner.

An essential requirement of the present invention is that the lanthanum be supplied to the mixture in the form of a lanthanum-silicon alloy having at least 0.4 percent silicon. The silicon acts to render the lanthanum passive while exposed to the normal atmosphere. Further, silicon alloyed with the lanthanum causes the lanthanum alloy to become friable and thus easily crushed to powders of desired size. If the lanthanum-silicon alloy contains less than 0.4 percent, it is ineffective for these purposes. It may contain a larger silicon content than 0.4 percent if desired. In practice, the upper silicon limit will usually be governed by the silicon level desired in the final product formed from the powder mixture or by the economics of making the lanthanum-silicon alloy.

It should be understood that the lanthanum-silicon alloy may also contain substantial quantities of other elements usually found in heat-resistant materials.

If less than about 0.02 percent lanthanum is present in the powder mixture of the invention, the oxidation-resistant characteristics of the compacted article produced are substantially reduced. More than about 0.2 percent lanthanum in the enriched powder tends to excessively lower the incipient fusion temperature of the compacted and metallurgically bonded product. It is preferred that the lanthanum level be no greater than 0.1 percent in order to improve the weldability of a shaped article formed from the enriched powder.

The powder mixture of the invention may contain one or more modifying elements normally found in materials of this class.

Although the exact mechanism is not understood, it is believed that the chromium and lanthanum interact after the mixture is compacted to provide superior oxidation-resistant properties in the compacted product.

The nickel and/or cobalt in an amount in excess of 30 percent is necessary in order to render the final compacted product resistant to oxidation at high temperatures. If desirable, the nickel and/or cobalt content of the powder mixture of the invention may be as much as the entire balance of the mixture.

In order to make the powder mixture of the invention a base powder comprised of the necessary amounts of chromium and nickel and/or cobalt in the above-described proportions is first prepared by conventional processing such as atomization of molten material. Next, a lanthanum-silicon alloy having at least 0.4 percent silicon and which may also contain other elements, is prepared. One method of preparing this alloy is to prealloy by melting lanthanum with silicon in a vacuum or inert atmosphere. It should be recognized, however, that many other methods of making this alloy could be utilized. The lanthanum-silicon alloy is pulverized to form an additive powder of the desired particle size (usually 60 mesh Tyler or finer). The resulting lanthanum-silicon additive powder is thereafter mixed with the base powder in a conventional manner, e.g., tumbling, in order to form a uniformly mixed lanthanum-enriched powder. The amount of additive powder mixed should be sufficient so as to provide 0.02 percent to 0.2 percent lanthanum in the enriched powder.

In order to make a shaped article according to the invention, the enriched powder is compacted in a conventional manner, e.g., cold compaction. The compacted article formed is thereafter metallurgically bonded, e.g., by sintering, to form the article of the invention. If desired, the compaction and metallurgical bonding may be accomplished in a single operation as by hot extrusion. It is preferable in either case to prevent oxidation during the metallurgical bonding operation by doing the same in the absence of an oxidizing atmosphere, e.g., in a vacuum or inert atmosphere.

The invention is illustrated by the following example:

A base alloy powder having the following composition was prepared by argon atomization of a molten melt:

| Element | Weight Percent |
| --- | --- |
| Carbon | 0.15 |
| Silicon | 0.17 |
| Tungsten | 13.40 |
| Nickel | 21.40 |
| Iron | 3.14 |
| Manganese | 0.63 |
| Chromium | 22.52 |
| Balance | Cobalt |

An additive alloy powder having the composition: lanthanum 40.06 percent; silicon 35.64 percent; and balance nickel and adventitious elements was prepared by direct reduction of lanthanum oxides in an electric arc furnace. The resulting alloy was easily crushed to less than 60 mesh (Tyler screen size) because of its improved friable characteristics imparted by the silicon content.

The additive powder was blended into the base alloy powder to form a lanthanum enriched powder. The amount of additive powder was sufficient to yield 0.1 percent lanthanum in the enriched powder. Blending was accomplished by tumbling the powders within an enclosed chamber. The enriched powder was thereafter placed into a steel can having an I.D. of 2 1/16 inches and a length of about 5 inches. To prevent contamination of the powders, the can was evacuated to a pressure of about 10 microns of mercury and sealed by welding.

The can was thereafter heated to about 2,200° F. and subsequently extruded through a die of ¾-inch diameter to densify and metallurgically bond the enclosed enriched powder. The extruded product was air cooled. Subsequently, the extruded product was decanned by dissolving the steel can in nitric acid. It was observed that the extruded metallurgically bonded product of this invention was essentially unaffected by the nitric acid treatment.

The enriched product was subsequently forged and thereafter rolled at 2,150° F. to a ⅛-inch thick sheet. The enriched product exhibited excellent hot workability.

Oxidation test samples were prepared from the resultant sheet and tested at 2,000° F. as follows:

The specimens were ground to a 120-grit finish and degreased in acetone.

The specimens were three-fourths inch by three-fourths inch by one-eighth inch nominally; however, each specimen's dimensions were precisely measured by a micrometer and the surface area and weights were also determined.

The specimens were exposed to a dry air flow of 7 ft.$^3$ per hour through a furnace tube of 1¾-inch I.D. to assure a controlled oxidation condition.

Four 25 hour periods at 2,000° F. were completed, each period followed by air cooling to room temperature to promote spalling of oxides.

Each sample was reweighed after the completion of the test. The weight change in milligrams per centimeter square was determined.

Each sample was then descaled in a $Na_2Co_3$-NaOH eutectic mixture at about 800° F. bath temperature.

Each descaled sample was subsequently weighed and the uniform depth of penetration expressed in mils per year (mpy) was determined by the following formula:

$$M.p.y. = \frac{Weight\ loss}{Density} \times \frac{1}{area\ of\ sample\ surface} \times \frac{100\ hours}{hours\ per\ year}$$

The same sample preparation and test procedure were performed upon a product made solely from the base powder.

The comparative results are presented in the following table and shown as a bar graph in the sole drawing.

TABLE I

| Sample No. | Lanthanum-enriched powder product | | | | Base powder product | | | |
|---|---|---|---|---|---|---|---|---|
| | 1 | 2 | 3 | 4 | 5 | 6 | 7 | 8 |
| Weight change, mg./cm.$^2$ | +1.1 | +0.6 | +0.7 | +1.0 | −3.9 | −5.0 | −3.6 | −4.4 |
| M.p.y. | 24 | 22 | 21 | (*) | 43 | 46 | 39 | (*) |

*These samples were used for metallographic examination and were not descaled for m.p.y. determinations.

The data shown in the drawing and table illustrate that when lanthanum-enriched powder mixtures of the invention are used to form compacted and metallurgically bonded articles, the articles will exhibit substantially improved oxidation resistance when compared with products formed from the base powder alone.

It should be emphasized that the base powder product itself is considered by many skilled in the art as an excellent oxidation-resistant material. The drawing and table illustrate that the oxidation attack is reduced by approximately one-half when articles are formed according to the invention.

What is claimed is:

1. A powder mixture suitable for being compacted into an oxidation-resistant metallic product, said powder mixture comprising (by weight) chromium: at least 10 percent, at least one of the group consisting of nickel and cobalt, the aggregate of which is greater than 30 percent, and a lanthanum-silicon alloy having a lanthanum content with respect to the total powder mixture of 0.02 to 0.2 percent, said lanthanum-silicon alloy containing at least 0.4 percent silicon.

2. A powder mixture as claimed in claim 1 wherein the chromium content by weight is between 15 percent and 35 percent and wherein the lanthanum-silicon alloy has a lanthanum content with respect to the total powder mixture of 0.02 to 0.1 percent.

3. A powder mixture as claimed in claim 1 wherein the lanthanum-silicon alloy has a lanthanum content with respect to the total powder mixture of 0.02 to 0.1 percent and wherein the aggregate content of at least one of the group consisting of nickel and cobalt is between 38 percent and the balance of the mixture.

4. A powder mixture as claimed in claim 1 wherein the chromium, nickel and cobalt present as claimed are supplied in prealloyed form.

5. A powder mixture as claimed in claim 1 wherein the particle size range is finer than 60 mesh Tyler screen size.

* * * * *